United States Patent [19]

Mickelsson et al.

[11] 4,257,340
[45] Mar. 24, 1981

[54] TRACTOR-DRAWN SEEDING APPARATUS

[75] Inventors: Seve-Mikael Mickelsson, Bollnäs; Sture R. Hall, Alfta, both of Sweden

[73] Assignee: AB Issesunds Bruk, Iggesund, Sweden

[21] Appl. No.: 960,951

[22] Filed: Nov. 15, 1978

[30] Foreign Application Priority Data

Nov. 23, 1977 [SE] Sweden .................. 7713206

[51] Int. Cl.³ ............................................. A01C 5/04
[52] U.S. Cl. ...................................... 111/1; 111/86
[58] Field of Search ............... 111/1, 6, 34, 52, 62, 111/73, 80, 85, 86, 7, 8, 9, 53, 54, 55, 56, 57, 58, 59, 60, 61; 172/72, 176, 194, 195, 197, 199, 200, 650, 538

[56] References Cited

U.S. PATENT DOCUMENTS

| 613,995 | 11/1898 | Homesley | 111/62 |
| 778,123 | 12/1904 | Fetzer | 172/538 |
| 909,137 | 1/1909 | Bellerive | 111/86 |
| 2,947,269 | 8/1960 | Queeny | 111/80 |
| 3,537,091 | 10/1970 | Schenkenberg | 111/1 X |
| 3,653,550 | 4/1972 | Williams | 111/1 X |
| 3,804,036 | 4/1974 | Seifert | 111/34 X |

FOREIGN PATENT DOCUMENTS

| 596790 | 10/1925 | France | 111/7 |
| 1121276 | 7/1956 | France | 111/62 |
| 1136771 | 12/1968 | United Kingdom | 111/1 |
| 121609 | 4/1958 | U.S.S.R. | 111/73 |
| 292613 | 1/1971 | U.S.S.R. | 111/86 |
| 622434 | 7/1978 | U.S.S.R. | 111/1 |

Primary Examiner—James R. Feyrer
Attorney, Agent, or Firm—Eric Y. Munson

[57] ABSTRACT

Seeding apparatus for use in connection with tractor-drawn seeding equipment, particularly reforesting equipment, comprising an inclined tubular member having one end pivotally connected to a thatching device or similar soil-breaking device at an elevated distance above the ground so as to yield returnably against torque in vertical and horizontal direction. The other end of the tubular member is provided with a terminal portion extending generally parallel to the ground and carries a tamping device for smoothing out and slightly compacting the seed bed. The seeds are ejected pneumatically at the rear of the tamping device through a seed conveyor channel or seed drill, extending through the inclined tubular member and connected at one end to a seed hopper carried by the tractor, and, at the other end, to a pneumatic ejector device in the terminal portion of the tubular member. Mulch to cover the planted seeds is supplied through conduits housed within the tubular member. The pneumatic seed-ejecting device and the mulch conduits are preferably supported resiliently in the terminal portion of the tubular member to counteract shocks and vibrations that may arise as the apparatus is dragged along the ground.

5 Claims, 3 Drawing Figures

TRACTOR-DRAWN SEEDING APPARATUS

FIELD OF THE INVENTION

The invention relates to a device for machine-seeding forest land which has previously been subjected to a so-called ground preparation step. The apparatus is designed to carry out, in a continuous sequence, tamping or slight compacting of the surface of the prepared ground along the area to be seeded, followed by intermittent ejection of forest seed, or so-called monocot seed, into the tamped surface, which steps may be combined with mulching or covering of the seed bed with external mulching material and control of the rate of seed ejection by means of equipment incorporated in the apparatus.

BACKGROUND OF THE INVENTION

Before seeding, the seed bed is prepared by thatching, harrowing, ploughing or tilling the soil. It has been shown that tamping of the soil surface which has been loosened up by the ground preparation equipment is desirable, in order to ensure suitable compactness of the seed bed. Proper compacting of the soil creates sufficient capillary attraction so that the upper soil layer will not dry out and thus impair the germination of the seeds. If the soil is too loose or porous, on the other hand, there is a risk of the seeds landing in cavities and being too deeply imbedded in the ground, which will impede their development into seedlings.

In agriculture and nursery operations, it is known to flatten or tamp the soil by means of a roller before sowing the seeds. In forestry, this method is not suitable, because of the greatly varying and sometimes very difficult terrain conditions. The presence of tree branches and tree stumps, and, particularly, large stones and hollows in the ground, renders the use of wheel devices impractical.

OBJECTS OF THE INVENTION

An apparatus suitable for the purpose mentioned by way of example herein, should be constructed so that it can be connected to and dragged behind the vehicle which serves as carrier for the seeding machine and which is flexible in vertical and lateral directions, so that it can follow the unevenness of the ground and avoid obstacles; should be resistant to twisting, so that the tamping unit will always be directly beneath an associated seed drill; should be shaped so as to counteract tendencies to become jammed between stones and other obstacles; and should provide good protection against pinching, shock and vibration of the seed ejecting and seed control equipment which is combined with the tamping device. These objects are attained by the apparatus embodying the characteristics defined in the accompanying claims.

SUMMARY OF THE INVENTION

The invention contemplates a seeding machine particularly for use in forestry, which can be hitched to the rear of a tractor or similar vehicle, comprising a tubular member having one end thereof connected to the tractor at an elevated distance above the ground so as to incline at an angle thereto and to yield returnably, in both vertical and horizontal directions, against torque or force which causes a deviation in the trailing position of the structure relative to the tractor to which it is attached. The other end of the tubular member has a substantially horizontal terminal portion supported in a generally pear-shaped tamping device adapted to be dragged along the ground. The tubular member houses a pneumatic mechanism of conventional construction for ejecting seeds at the rear of the tamping device and may include means for conveying mulch to cover the planted seeds.

DETAILED DESCRIPTION OF AN EMBODIMENT OF THE INVENTION

Figure 1:
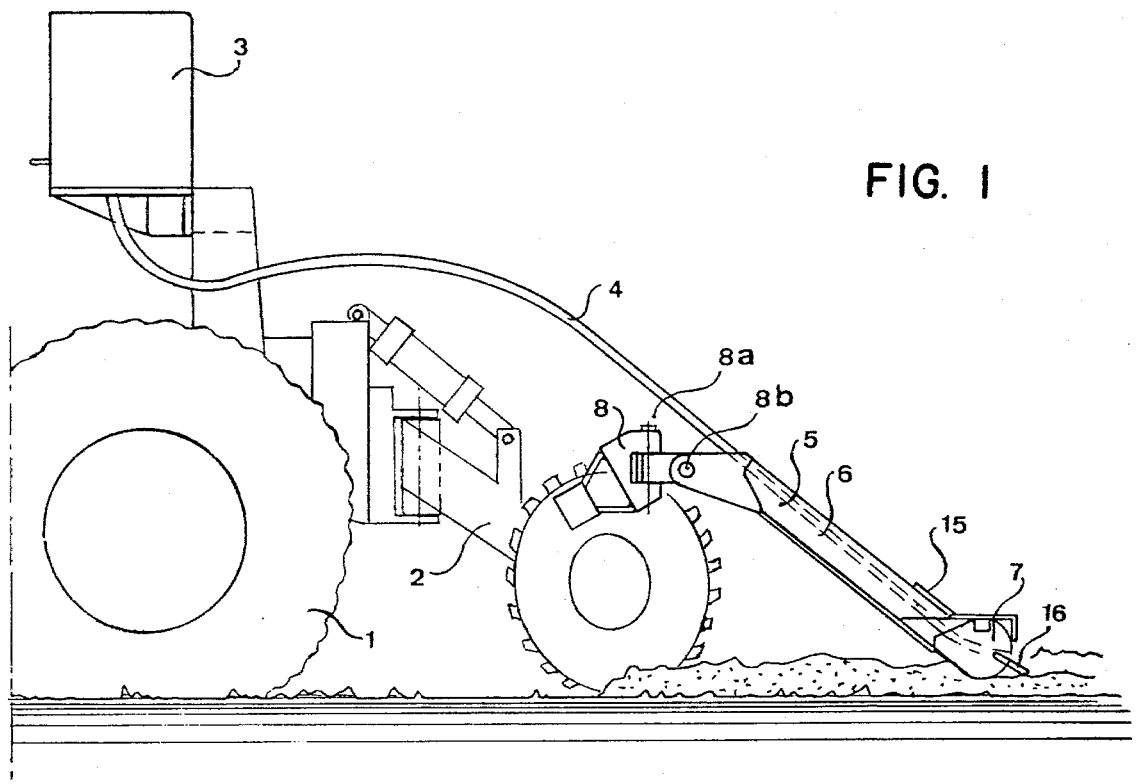
FIG. 1 is a schematic side view of an apparatus embodying the invention.
Figure 2:
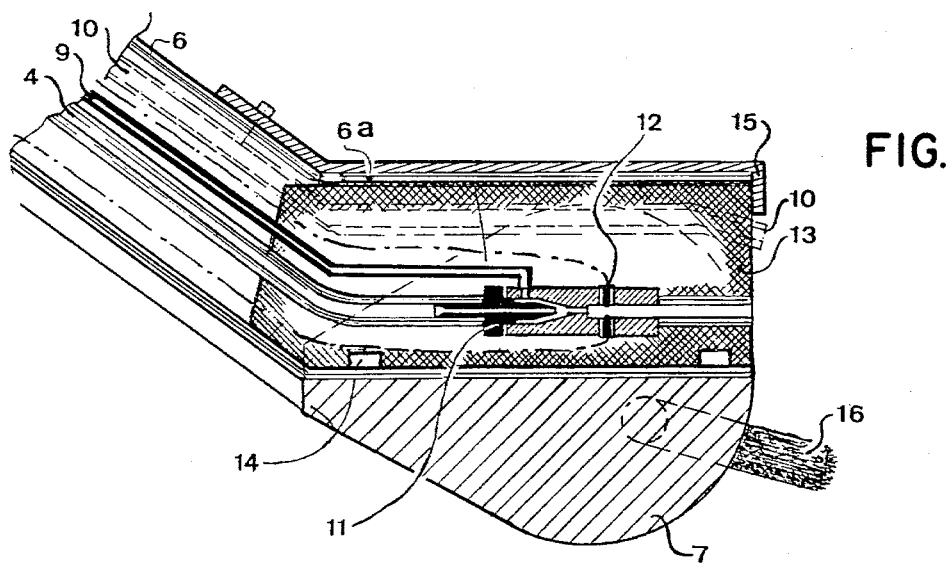
FIG. 2 is a section drawn to an enlarged scale of the ground-engaging portion of the device shown in FIG. 1
Figure 3:
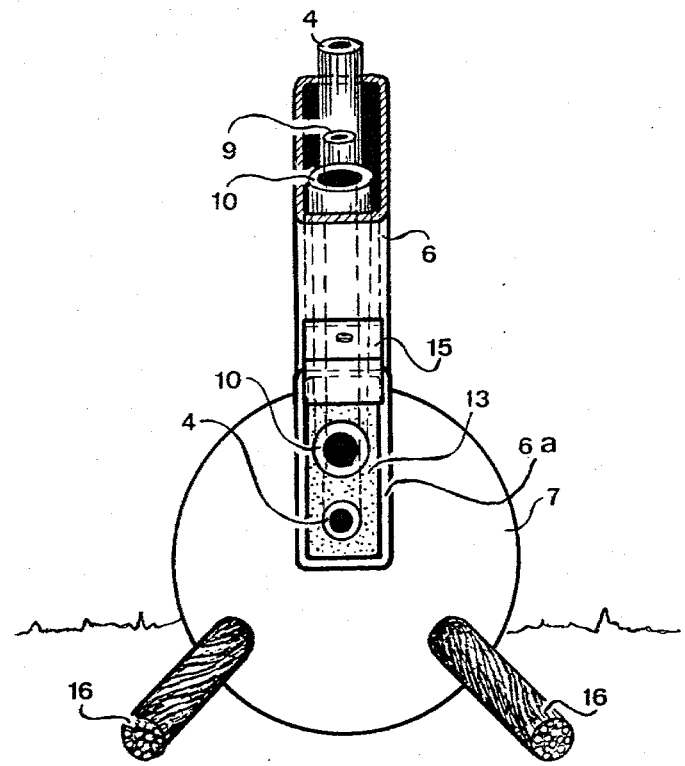
FIG. 3 is a rear view of the portion shown in FIG. 2.

In the drawings, the reference numeral 1 indicates the rear end portion of a tractor or similar vehicle to which is hitched a ground-preparing device 2, which vehicle also serves as a support for a seed hopper 3. To the latter is connected a seed-feeding line 4 which leads to the seed drill 5 of the invention. The seed drill 5 comprises principally a tubular member 6 and a generally pear-shaped tamping device 7. In the embodiment shown, the seed drill is coupled to the ground-preparing device 2 by means of shackles 8 forming a bearing for the vertical pivot pin 8a and the horizontal pivot pin 8b, which allows the seed drill to swing laterally and vertically so that it follows the uneven contour of the terrain, but is relatively resistant to twisting, because of the proportionate length of the arms. The tubular member 6 merges at its lower end with an angled portion 6a, which extends in a generally horizontal direction when the seed drill is in its working position. The tamping device 7 is provided with a recess or slot, the bottom and side walls of which surround the terminal portion 6a of the tubular member, to which the tamping device is attached by means of screws 14. A protective clamp 15 is provided at the top when the terminal portion 6a is not covered by the surrounding portions of the tamping device.

The seed feedline 4 and a pneumatic air tube 9 and, if desired, a mulch tube 10 (which is fed from mulch container not shown), extend through the tubular member 6 and emerge through the outer end of the terminal portion 6a above the rear end of the tamping device 7.

In order to ensure conveyance of seed through the feed line 4 as free from disturbances as possible, the ejector means 11 is arranged in the line a short distance ahead of the nozzle opening above the rear end of the tamping device 7. The ejector means creates, by means of pressure air which is supplied by the tube 9, an under pressure in that portion of the feed line which precedes the ejector means and an over pressure in the short nozzle portion beyond the ejector means.

Furthermore, a seed sensor device 12 is arranged in the feed line 4 a short distance from its mouth in the rear end of the tamping device. The seed sensing means comprises electronic signal and receiver means located in diametrically opposite sides of the feed line. The sensor device detects each passing seed and can be adjusted to produce a signal to a lamp which can be observed by an operator, for instance, the driver of the tractor pulling the seeding device. A conventional monitor can be employed, for example, to produce a light signal for every fifth passing seed grain, and can also be adapted to produce a sound signal if the feed of seed should be interrupted. It is advantageous to locate the seed control device a short distance ahead of the nozzle of the feed line. If the seed sensor means is located further inward in the feedline, satisfactory detection of blocked conditions that may arise in the lower portion of the feed line is not attained. Thus, it can happen that the driver will work a long stretch before the absence of seeds passing the detector is detected, and it will then be difficult to discover where the seeding was interrupted.

In the embodiment shown, the entire lower portion of the feed line with the ejector means and the seed control device are embedded in elastic material 13 which fills the terminal portion 6a, in order for the seed control device to withstand the rough treatment to which it is subjected due to its location in the tamping device which is dragged along the terrain. Alternatively, some other form of resilient suspension may be used.

In the embodiment shown, the tamping device is substantially pear-shaped, with the pointed end of the pear facing the direction in which it is dragged. This shape, with smooth rounded surfaces and a forwardly sloping portion, minimizes the tendency of the device to catch between rocks or other obstacles and also creates a breaking-up effect on such obstacles in the event jamming should still occur.

The tamping device may be provided with raking means 16 which extend downwardly from the rear at a diverging angle and comprise short steel wire stubs or similar flexible means.

The device according to the invention operates as follows: In its working position, the apparatus is connected at one of its ends to the rear of a supporting vehicle or to a ground-preparing device attached thereto and is dragged behind the latter with the tamping device at the other end in contact with the ground. The soil has immediately before or in a separate previous step been prepared by some kind of ground conditioning equipment. Seed is fed in desired amount and at desired intervals from the seed hopper 3 through the feed line 4 and planted in the soil through the nozzle opening in the end of the terminal portion 6a. The seeding continues from the moment the tamping device has just formed the shallow furrow in the previously loosened soil.

Under certain circumstances and favorable weather conditions, it may be assumed that the seeds have landed in sufficiently good germinating environment in the prepared and tamped soil. Under other circumstances, it may be thought that the operation will not produce fully satisfactory results unless the seeds are covered by a certain amount of mulch. The cover should be porous, and the layer of mulch thin—not over 10 m.m. The mulch serves as protection against sun and birds, small rodents, etc. In order to provide the mulch cover for the seeds, the tamping device may be equipped with a mulching tool 16, consisting of short projecting wires and the like, so arranged that they rake down over the seeds a certain amount of soil from the mounds of the furrow formed by the furrow-forming tamping device. In some cases, it may turn out that this is not fully satisfactory, and it is desirable to supply external mulching material in order to protect the seeds and to improve the germination. For this purpose, the apparatus according to the invention may be equipped with a mulch supply line 10, which is connected to a mulch hopper carried by the vehicle. The mulch material is fed in the same manner as the seeds, through an outlet in the end of the tubular member 6a, which outlet is located above the seed outlet so that the planted seeds will be covered by the mulch material. In this manner, a controlled amount of mulch material can be supplied, which can be selected according to optimal suitable qualities with respect to germination, as well as to protection.

Without special arrangements, it is difficult to control the seeding operation so that it is maintained in a desired manner, i.e., the seeds are fed out in desired amounts and at desired intervals without any interruptions or blocking or other irregularities. The apparatus according to the invention is, therefore, provided with the above-described seed sensor means 12, which, for maximum effective monitoring of the seed feed through the line 4, has been located in close proximity to the outlet.

For the purpose of attaining the highest possible freedom from disturbances in the seed feed through the supply line 4, the ejector device 11 is also located adjacent the outlet of the line. The seed supply through the line is thus accomplished by suction along the entire length, with the exception of a very short portion before the outlet. An under-pressure that "draws" has less tendency to cause blocking in the line than an over-pressure that "pushes".

We claim:

1. Apparatus for seeding singulated forest seeds, for connection to the rear of tractor-drawn ground preparing means, comprising a generally tubular member having one end connected by means of a universal joint to said tractor-drawn means at an elevated distance above the ground for movement in vertical and lateral direction, the other end of said tubular member having a terminal portion extending at an angle to said tubular member in a generally horizontal direction, said terminal portion extending through a generally pear-shaped tamping means carried by said terminal portion for compacting the soil while being dragged along the ground and having its pointed end facing in the direction of drag, said tubular member comprising conduit means, including pneumatic means supported by elastic stuffing material in said terminal portion for ejecting seeds at the rear of said tamping means as the latter is dragged along the ground, said universal joint comprising a first arm pivoted to said ground-preparing means to move about a vertical axis, and a second arm supporting said tubular member pivoted to said first arm to move about a horizontal axis, the length of said arms relative to the length of said tubular member being proportioned so as to allow said tubular member to move relatively freely vertically and horizontally in response to unevenness in the terrain while being relatively resistant to twisting while being dragged along the ground.

2. Apparatus according to claim 1, in which said conduit means includes means for supplying mulching material to cover the seeded bed.

3. Apparatus according to claim 1, in which said conduit means includes seed sensor means located adjacent the outlet of the conduit means for monitoring the rate of seed feed.

4. Apparatus according to claim 1, in which said pneumatic means includes an ejector means located in said conduit means adjacent the outlet thereof, which creates an under-pressure in that portion of the conduit means which extends ahead of the ejector means, and an over-pressure in the portion extending beyond the ejector means in the direction of discharge.

5. Apparatus according to claim 1, in which the tamping means is provided with rearwardly projecting diverging resilient means for raking soil over the seeds from the walls of the furrows formed by the tamping means.

* * * * *